US012658149B2

(12) United States Patent
Bareiß et al.

(10) Patent No.: US 12,658,149 B2
(45) Date of Patent: Jun. 16, 2026

(54) METHOD FOR OPERATING A DISPLAY DEVICE OF A CHARGING STATION, CONTROL DEVICE FOR CARRYING OUT SUCH PROCESS AND CHARGING STATION WITH THE DISPLAY DEVICE AND ONE SUCH CONTROL DEVICE

(71) Applicant: ads-tec Energy GmbH, Nürtingen (DE)

(72) Inventors: Simon Bareiß, Rudersberg (DE); Jörg Ramin, Kirchheim (DE)

(73) Assignee: ADS-TEC ENERGY GMBH, Nürtingen (DE)

( * ) Notice: Subject to any disclaimer, the term of this patent is extended or adjusted under 35 U.S.C. 154(b) by 0 days.

(21) Appl. No.: 18/767,021

(22) Filed: Jul. 9, 2024

(65) Prior Publication Data

US 2025/0022429 A1 Jan. 16, 2025

(30) Foreign Application Priority Data

Jul. 13, 2023 (DE) .......................... 102023118661.2

(51) Int. Cl.
| | |
|---|---|
| *G09G 3/34* | (2006.01) |
| *B60L 53/30* | (2019.01) |
| *B60L 53/302* | (2019.01) |
| *B60L 53/60* | (2019.01) |

(52) U.S. Cl.
CPC .......... *G09G 3/3406* (2013.01); *B60L 53/302* (2019.02); *B60L 53/305* (2019.02); *B60L 53/60* (2019.02); *G09G 2330/027* (2013.01); *G09G 2380/10* (2013.01)

(58) Field of Classification Search
CPC ........... G09G 3/3406; G09G 2330/027; G09G 2380/10; B60L 53/302; B60L 53/305; B60L 53/60; B60L 53/31; B60L 2250/16
See application file for complete search history.

(56) References Cited

U.S. PATENT DOCUMENTS

| | | | | |
|---|---|---|---|---|
| 2010/0141669 A1* | 6/2010 | Sadahiro | .............. | G09G 3/3611 |
| | | | | 345/589 |
| 2012/0188287 A1* | 7/2012 | Wurzel | ................... | G06F 1/203 |
| | | | | 345/690 |
| 2016/0009191 A1* | 1/2016 | Becker | .................... | B60L 53/14 |
| | | | | 320/152 |
| 2020/0193904 A1* | 6/2020 | Kho | ...................... | G09G 3/3233 |
| 2023/0219435 A1* | 7/2023 | Wang | ...................... | B60L 53/16 |
| | | | | 320/109 |
| 2024/0332984 A1* | 10/2024 | Kissick | ................... | B60L 53/68 |
| 2024/0405343 A1* | 12/2024 | Okoniewski | ........ | H01M 50/271 |
| 2025/0210003 A1* | 6/2025 | Sun | ...................... | G09G 3/3406 |

FOREIGN PATENT DOCUMENTS

| | | |
|---|---|---|
| DE | 112006002269 T5 | 6/2008 |
| DE | 102012204154 A1 | 9/2013 |
| DE | 202013105353 U1 | 1/2014 |
| DE | 102012110061 A1 | 4/2014 |

* cited by examiner

*Primary Examiner* — Christopher E Leiby
(74) *Attorney, Agent, or Firm* — Carter, DeLuca & Farrell LLP; George Likourezos

(57) ABSTRACT

The invention relates to a method for operating a display device of a charging station, wherein
an operating state of the display device is set based on a display device temperature assigned to the display device and a charging station temperature state assigned to the charging station, wherein
the display device is set to the operating state.

12 Claims, 2 Drawing Sheets

Figure 1:
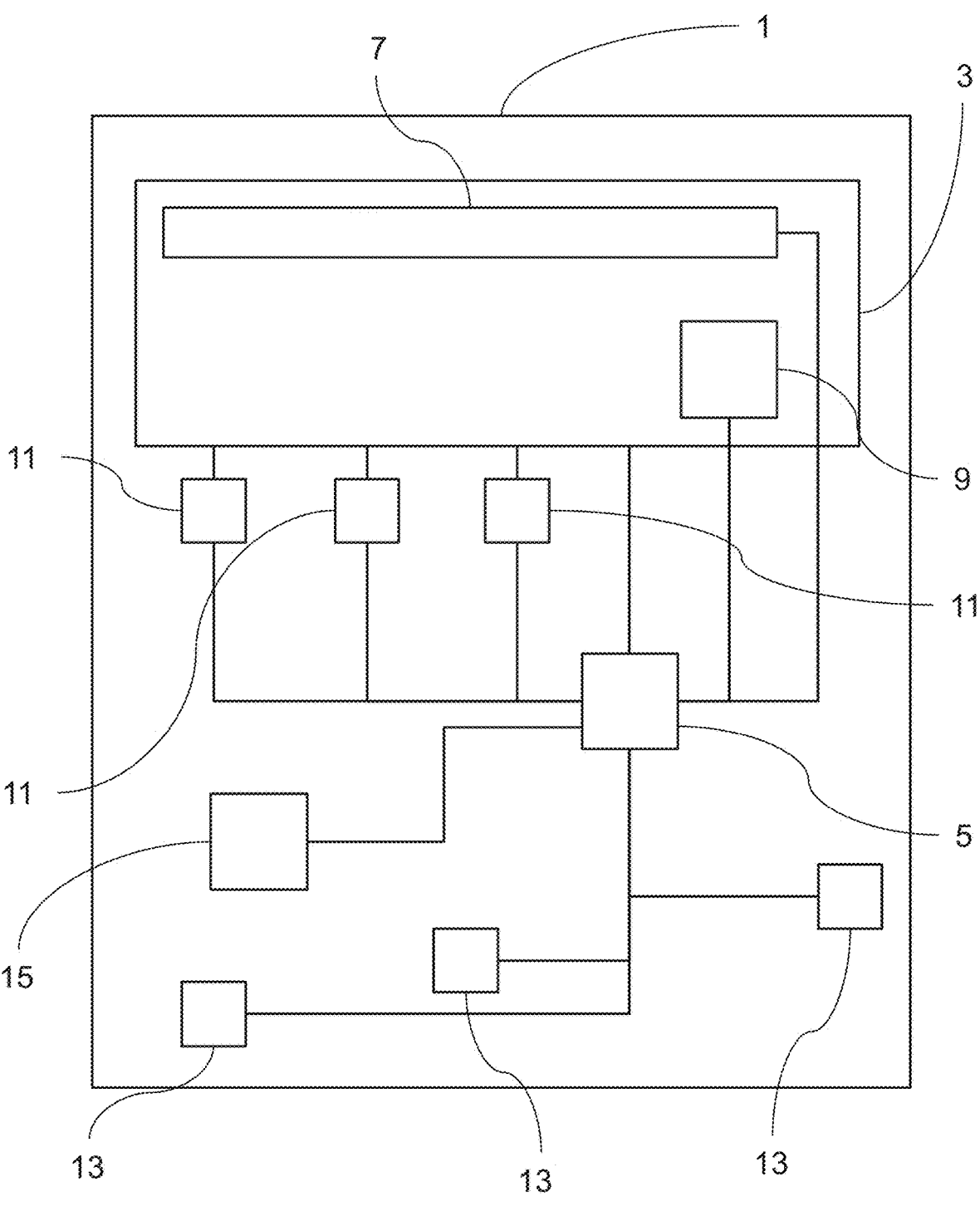

METHOD FOR OPERATING A DISPLAY DEVICE OF A CHARGING STATION, CONTROL DEVICE FOR CARRYING OUT SUCH PROCESS AND CHARGING STATION WITH THE DISPLAY DEVICE AND ONE SUCH CONTROL DEVICE

CROSS REFERENCE TO RELATED APPLICATION

This application claims priority to and the benefit of German Patent Application No. 102023118661.2 filed on Jul. 13, 2023, the entire contents of which are incorporated herein by reference.

The invention relates to a method for operating a display device of a charging station, a control device for performing such a method and a charging station with the display device and such a control device.

Charging stations, in particular fast charging stations for motor vehicles comprising an electric drive, are becoming increasingly important. Furthermore, it is known that such charging stations comprise display devices adapted to display information, typically advertisements. In particular, such display devices should only be operated at predetermined temperatures, as otherwise screens, typically liquid crystals of the display technology, are permanently damaged. In addition, the display devices generate waste heat, which must also be dissipated at least temporarily and therefore has a negative effect on a power supply and/or possibly a storage capacity, for example of a battery, of the charging station.

The invention is therefore based on the task of creating a method for operating a display device of a charging station, a control device for carrying out such a method and a charging station with the display device and such a control device, wherein the aforementioned disadvantages are at least partially eliminated, preferably avoided.

The task is solved by providing the present technical teaching, in particular the teaching of the independent claims and the embodiments disclosed in the dependent claims and the description.

In particular, the task is solved by providing a method for operating a display device of a charging station. An operating state of the display device is set based on a display device temperature associated with the display device and a charging station temperature state associated with the charging station. The display device is then set to the operating state. Advantageously, this makes it possible to operate the display device in a suitable operating state based on parameters of the charging station—namely the display device temperature and the charging station temperature state—and thus, in particular, to reduce waste heat from the display device.

In one embodiment, the display device temperature is determined by means of a display device temperature sensor.

In one embodiment, a display device area temperature assigned to a spatial area of the display device is determined by means of the display device temperature sensor, wherein the display device temperature corresponds to the display device area temperature.

Furthermore, the charging station temperature state is preferably determined and/or predetermined by a control unit of the charging station.

According to a further development of the invention, it is provided that the operating state is selected from a group consisting of: a first operating state in which a backlight of the display device is switched off, a second operating state in which the backlight of the display device is switched on, and a third operating state in which the display device is—completely—switched off. Advantageously, by switching off the backlight and/or switching off the display device, it is possible to reduce waste heat from the display device and thus maintain, preferably improve, the power provision of the charging station. Furthermore, by switching off the display device, it is advantageously possible to protect the display device from permanent damage if the display device temperatures are too low and/or too high.

In particular, the display device is switched on in the first operating state and in the second operating state.

According to a further development of the invention, it is provided that a load state of a climate conditioning device of the charging station is used as the charging station temperature state. In the context of the present technical teaching, a load state of the climate conditioning device is understood in particular to be a thermal load state of the climate conditioning device.

In one embodiment, the load state is selected from a group consisting of a normal state and an overload state. This makes it advantageously possible to reduce the waste heat of the display device based on the operating state—in particular by switching off the backlight and/or switching off the display device—and thus relieve the load on the climate conditioning device of the charging station. This also has a positive effect on the performance of the charging station.

In one embodiment, it is provided that the load state is determined by comparing at least one load variable of the climate conditioning device with a predetermined load variable target value that is assigned to the at least one load variable.

In one embodiment, it is provided that the at least one load variable is selected from a condenser temperature of the climate conditioning device, a condenser pressure of the climate conditioning device, and a combination of said load variables. Advantageously, the load variables mentioned here are particularly suitable for determining the load state of the climate conditioning device, in particular since all relevant circumstances and also ambient conditions—especially with regard to re-cooling of the climate conditioning device—are already intrinsically included in these load variables. The load variables mentioned thus take into account both the thermal load of the climate conditioning device in particular and an instantaneous recooling capacity, for example due to a temperature difference to the environment, in a simple manner.

In the context of the present technical teaching, a condenser temperature is understood in particular to be a temperature that is characteristic of a condensation temperature and/or a condensation pressure of the refrigerant in the condenser of the climate conditioning device, which is configured in particular as a compression refrigeration machine or comprises a compression refrigeration machine. This has a closed refrigerant circuit which comprises the following refrigeration components in the specified order in the direction of flow of the refrigerant: a refrigerant compressor, the condenser, a throttle device or an expansion valve, and an evaporator. In particular, the climate conditioning device is adapted to perform a thermodynamic cycle.

In one embodiment, the condenser temperature can be directly the condensation temperature of the refrigerant in the condenser. In another embodiment, the condenser temperature can be, for example, a temperature of a warm branch of a recooling circuit operatively connected thermally to the condenser for recooling, for example a recooling refrigerant circuit, in particular a recooling cooling water circuit. In yet another embodiment, the condenser temperature can be detected upstream or downstream of the condenser in the refrigerant circuit of the climate conditioning device.

In the context of the present technical teaching, a condenser pressure is understood in particular to be a pressure that is characteristic of the condensation pressure and/or the condensation temperature of the refrigerant in the condenser of the climate conditioning device. In one embodiment, the condenser pressure can be directly the condensation pressure of the refrigerant in the condenser. In another embodiment, the condenser pressure can be detected upstream or downstream of the condenser in the refrigerant circuit of the climate conditioning device.

In one embodiment, it is provided that a regulation factor is determined by a regulation controller, wherein an instantaneous value of the at least one load variable is entered as an actual value and the predetermined load variable target value assigned to the at least one load variable is entered as a setpoint value, wherein the regulation factor is determined, in particular calculated, as a function of a control deviation of the actual value from the setpoint value. Advantageously, the regulation factor can thus be determined in a simple, fast, less computationally intensive and at the same time precise manner. In particular, the regulation factor is a measure of the thermal load of the climate conditioning device. It is preferred that the charging station's charging power is limited as a function of the regulation factor.

In one embodiment for the regulation controller an actual condenser pressure, in particular an actual condensation pressure, of the climate conditioning device is used as the actual value and a setpoint condenser pressure, in particular a setpoint condensation pressure, for the climate conditioning device is used as the setpoint value.

In one embodiment, a proportional-integral controller (PI controller) is used as the regulation controller to determine the regulation factor.

It is possible that control parameters of the regulation controller can be parameterized by an operator of the charging station. In particular, it is possible that at least one control parameter, selected from a control gain and a reset time, can be set by the operator. In one embodiment in particular, both the control gain and the reset time can be set by the operator.

The condenser pressure, in particular the condensation pressure, can have a permissible value range of 1 bar to 30 bar when using R513a as the refrigerant, for example. In one embodiment, the target condenser pressure, in particular the target condensation pressure, is from 18 bar to 25 bar. Other values may apply or be selected for other refrigerants.

In one embodiment, it is provided that an overload test step is used to check whether an overload state of the climate conditioning device is present. In particular, it is determined in the overload test step that the overload state is present if the load state-represented in particular by the regulation factor and/or the at least one load variable-exceeds a predetermined first load state threshold value, and in addition at least one further thermal parameter, in particular two further thermal parameters of the charging station, exceeds an associated first thermal parameter threshold value. In the overload test step, it is determined that there is no overload state if the load state—in particular the regulation factor and/or the at least one load variable as the parameters characteristic of the load state or representing the load state-falls below a predetermined second load state threshold value, and in addition the at least one further thermal parameter, in particular the two further thermal parameters, falls below an assigned second thermal parameter threshold value.

In particular, the normal state is present when the overload state is not present.

In one embodiment, the predetermined first load state threshold value is greater than the predetermined second load state threshold value. Alternatively or additionally, the first thermal parameter threshold values are each greater than the associated second thermal parameter threshold values. Advantageously, this results in a hysteresis in the determination of the overload state.

In particular, in one embodiment, the predetermined second load state threshold value is equal to the predetermined first load state threshold value minus a load state hysteresis value. Alternatively or additionally, the first thermal parameter threshold values are each equal to the associated second thermal parameter threshold values minus any associated thermal parameter hysteresis values.

In another embodiment, the predetermined first load state threshold value is equal to the predetermined second load state threshold value. Alternatively or additionally, the first and second thermal parameter thresholds associated with each other are each equal.

In one embodiment, it is provided that the at least one further thermal parameter is selected from a group consisting of: a battery temperature of the battery of the charging station, a coolant temperature of a coolant of a coolant circuit, and a combination of said thermal parameters. These thermal parameters are each characteristic of an overall thermal load occurring in the charging station and are therefore also relevant for assessing the existence of an overload state.

The coolant is, in particular, a coolant circulating in a coolant circuit provided for cooling the charging station, in particular cooling water, optionally in combination with an antifreeze, in particular glycol. In one embodiment, a coolant tank temperature in a coolant tank, in particular a water tank, is recorded as the coolant temperature, wherein the coolant tank serves in particular as a storage and/or buffer vessel for the coolant circuit and is in particular integrated into the coolant circuit. The coolant tank temperature is therefore characteristic of a temperature of the coolant circuit and thus a thermal load occurring in the coolant circuit.

In one embodiment, the overload state is determined in the overload test step to be present when the regulation factor exceeds the predetermined first load state threshold, and additionally the battery temperature and the coolant temperature exceed their respective associated first thermal parameter thresholds. Alternatively or additionally, in the overload test step, it is determined that the overload state is not present if the regulation factor falls below the predetermined first load state threshold value minus the load state hysteresis value, and additionally the battery temperature and the coolant temperature fall below their respective assigned first thermal parameter threshold values minus the respective thermal parameter hysteresis value.

For example, the battery temperature can have a permissible value range of −20° C. to 45° C. The coolant temperature, in particular a coolant tank temperature, can have a permissible value range of −20° C. to 35° C.

In one embodiment, the predetermined first load state threshold value is from 0.3 to 0.6. Alternatively or additionally, the predetermined second load state threshold value is from 0.1 to 0.4. Alternatively or additionally, the load state hysteresis value is from 0.2 to 0.6, in particular up to 0.3.

Alternatively or additionally, the first thermal parameter threshold value associated with the battery temperature is from 30° C. to 40° C. Alternatively or additionally, the second thermal parameter threshold value assigned to the battery temperature is from 25° C. to 35° C. Alternatively or additionally, the heat parameter hysteresis value assigned to the battery temperature is from 5° C. to 15° C.

Further alternatively or additionally, the first thermal parameter threshold value associated with the coolant temperature, in particular the coolant tank temperature, is from 28° C. to 35° C. Alternatively or additionally, the second thermal parameter threshold value associated with the coolant temperature, in particular the coolant tank temperature, is from 20° C. to 30° C. Alternatively or additionally, the heat parameter hysteresis value associated with the coolant temperature, in particular the coolant tank temperature, is from 5° C. to 15° C.

According to a further development of the invention, it is provided that a display device operating mode is additionally used to determine the operating state. Advantageously, it is thus possible, in particular, to take into account preferences of an operator of the charging station with regard to the operation of the display device when determining the operating state.

According to a further development of the invention, it is provided that the display device operating mode is selected from a group consisting of a normal operation and a priority operation. Preferably, the display device operating mode is specified by an operator of the charging station. It is possible for the operator of the charging station to set and/or change the display device operating mode directly at the charging station, by remote maintenance, by radio transmission and/or by wired data transmission. In particular, by selecting priority operation, the operator can prioritize the operation of the display device higher than the discharge of the climate conditioning device; conversely, by selecting normal operation, the operator can prioritize the discharge of the climate conditioning device higher than the operation of the display device. Furthermore, a default value can be preset for the display device operating mode, which the operator can overwrite if necessary.

According to a further development of the invention, it is provided that a charging station internal temperature of the charging station is also used to determine the operating state. Advantageously, it is thus possible to include the temperature relevant for the operation of the display device in the determination of the operating state and in this way to protect the display device from permanent damage, in particular at excessively low temperatures. Especially when the display device is supplied with air from the inside of the charging station, the charging station internal temperature as the temperature characteristic of the air flow is also the temperature relevant for the operation of the display device.

In the context of the present technical teaching, the charging station internal temperature is a temperature of the air in an interior of the charging station.

In one embodiment, the charging station internal temperature is determined by means of a charging station temperature sensor.

In one embodiment, the charging station temperature sensor is used to determine a charging station internal temperature associated with an internal spatial area of the charging station, preferably an area of a battery of the charging station, wherein the charging station internal temperature corresponds to the charging station area internal temperature.

In an alternative embodiment, the charging station internal temperature is determined by means of a plurality of charging station temperature sensors.

In one embodiment, the plurality of charging station temperature sensors is used to determine a respective charging station area internal temperature assigned to an inner spatial sub-area of the charging station, in particular an area of the battery of the charging station, wherein the charging station internal temperature corresponds to a maximum or an average value of the plurality of charging station area internal temperatures. In particular, the plurality of charging area station internal temperatures is assigned to a common point in time.

In one embodiment, the air in the charging station is used for temperature control of the display device. It is therefore advantageous to know the charging station internal temperature and to use it to determine the operating state.

When the charging station is used as intended, the charging station internal temperature is typically from −20° C. to 45° C., in particular depending on the season and weather.

According to a further development of the invention, it is provided that a fan operating point of at least one fan associated with the display device is set based on the display device operating mode. Furthermore, the fan is set to the fan operating point. Alternatively or in addition to reducing the waste heat of the display device, it is advantageously possible to cool the display device by means of the fan and thus prevent permanent damage to the display device.

Preferably, a fan speed of the at least one fan associated with the display device is set as the fan operating point.

According to a further development of the invention, it is provided that at least one fan operating point parameter is additionally used to determine the fan operating point. The at least one fan operating point parameter is selected from a group consisting of a charging station ambient temperature, the display device temperature, a target display device temperature, a fan control parameter, and any combination of at least two of the preceding parameters.

In one embodiment, the target display device temperature is selected as a function of the charging station ambient temperature and/or the display device operating mode. In particular, a normal operation correlation—in particular a normal operation characteristic curve or normal operation lookup table—and a priority operation correlation—in particular a priority operation characteristic curve or priority operation lookup table—are used to determine the target display device temperature as a function of the charging station ambient temperature. The priority operation context assigns a first target display device temperature to a first charging station ambient temperature, and the normal operation context assigns a second target display device temperature to the first charging station ambient temperature, wherein the first target display device temperature is at most as large as, in particular smaller than, the second target display device temperature. This advantageously results in greater cooling in priority operation compared to normal operation at the same charging station ambient temperature. In particular, a plurality of charging station ambient temperatures with the respective assigned target display device temperatures are stored in a characteristic curve or lookup table. Alternatively, for normal operation of the display device—i.e. the display device operating mode corresponds to normal operation—a plurality of charging station ambient temperatures with the respective assigned target display device temperatures are stored in the normal operation characteristic curve or normal operation lookup table. Alternatively or additionally, for priority operation of the display device—i.e. the display device operating mode corresponds to priority operation-a plurality of charging station ambient temperatures with the respective associated target display device temperatures are stored in the priority operation characteristic curve or priority operation lookup table. In particular, the priority operation characteristic curve is offset from the normal operation characteristic curve with respect to the charging station ambient temperature in the direction of increasing charging station ambient temperatures. Alternatively or additionally, the priority operation characteristic curve is offset, i.e. lowered, with respect to the normal operation characteristic curve in relation to the target display device temperature in the direction of decreasing target display device temperature.

In a preferred embodiment, a controller, in particular a PI controller, is used to determine the fan operating point based on the display device temperature, the target display device temperature and the fan control parameter, as well as depending on, in particular, parameterizable controller parameters such as a control gain and a reset time. The target display device temperature is selected as a function of the display device operating mode and the charging station ambient temperature, in particular optionally by means of the priority operation context or the normal operation context.

In particular, a temperature of 30° C. to 65° C. is selected as the target display device temperature.

According to a further development of the invention, it is provided that a plurality of display device temperature sensors are each used to determine a display device area temperature—in particular assigned to a common point in time-, wherein the display device temperature is determined on the basis of the plurality of display device area temperatures. Advantageously, this makes it possible to determine the display device temperature accurately and reliably.

In one embodiment, the display device temperature is determined by means of a plurality of display device temperature sensors.

In one embodiment, a display device area temperature assigned to a spatial area of the display device is determined by means of the plurality of display device temperature sensors, wherein the display device temperature corresponds to a maximum or an average value of the plurality of display device area temperatures.

According to a further development of the invention, it is provided that the first operating state is set when the charging station temperature state is in the overload state, the display device operating mode is in the priority operation and the display device temperature is greater than a maximum display device temperature. Alternatively or additionally, the first operating state is set when the charging station temperature state is in the overload state and the display device operating mode is in the normal operation state, in particular regardless of the display device temperature. Alternatively or additionally, the second operating state is set when the charging station temperature state is in the normal state and the charging station internal temperature is at least equal to a at least display device ambient temperature. Alternatively or additionally, the third operating state is set when the charging station temperature state is in the normal state and the charging station internal temperature corresponds at most to a minimum display device ambient temperature.

Preferably, the maximum display device temperature is from 40° C. to 70° C. Alternatively or additionally, the at least display device ambient temperature is from 5° C. to 15°

C. Alternatively or additionally, the minimum display device ambient temperature is from −5° C. to 5° C.

In one embodiment, the at least display device ambient temperature is equal to the minimum display device ambient temperature.

In an alternative embodiment, the at least display device ambient temperature is greater than the minimum display device ambient temperature. Advantageously, a hysteresis is thus configured between switching off the display device and switching it on again, so that small fluctuations in the charging station internal temperature have no influence on the operating state of the display device.

In one embodiment, at least one temperature, selected from a group consisting of the maximum display device temperature, the at least display device ambient temperature, the minimum display device ambient temperature, and a combination of at least two of the preceding temperatures, is predetermined by the operator of the charging station. It is possible for the operator of the charging station to set and/or change the at least one temperature selected from the above group directly at the charging station, by remote maintenance, by radio transmission, and/or by wired data transmission. Furthermore, a default value can be preset for the at least one temperature selected from the above group, which the operator can overwrite if necessary.

According to a further development of the invention, it is provided that the operating state of the display device is set repeatedly.

Preferably, the operating state of the display device is set with a predetermined time interval or with a frequency of 1 Hz to 10 Hz, particularly preferred 5 Hz. Each time the operating state is set, the display device is set to the last operating state set, which includes that it remains in its previous operating state if this does not differ from the last operating state set.

The task is also solved by providing a control device which is adapted to performing a method according to the invention or a method according to one or more of the previously described embodiments. In particular, the advantages already explained in connection with the method arise in connection with the control device.

Preferably, a communication connection is configured between the display device, the charging station and the control device, wherein the control device is controllably operatively connectable, particularly preferred controllably operatively connected, to the charging station and the display device in order to performing a method according to the invention or a method according to one or more of the previously described embodiments.

The task is also solved by providing a charging station comprising a display device comprising a backlight and a control device according to the invention or a control device according to one of the previously described embodiments. In particular, the advantages already explained in connection with the method and the control device arise in connection with the charging station.

In electrical engineering, a charging station is any device or electrical system, in particular stationary or mobile, which is used to supply energy to mobile battery-powered devices, machines or motor vehicles by simply setting or plugging them in, without necessarily having to remove the energy storage device—such as the traction battery of an electric car. Charging stations for electric cars are sometimes also referred to as "current charging stations" and can include several charging points. High performance charging systems (HPC systems) such as the combined charging system (CCS), which is widespread in Europe, are known in particular. With generic direct current charging, direct current from the charging station is fed directly into the vehicle's battery and supplied by a powerful rectifier, preferably from the charging station, from the power grid or from large buffer accumulators at solar charging stations, for example. There is a battery management system in the vehicle that communicates directly or indirectly with the charging station in order to adjust the current and voltage or to terminate the process when a predetermined capacity limit is reached. Power electronics are usually located in the charging station. As the direct current connections of the charging station are connected directly-without going through an AC/DC converter in the vehicle—to the corresponding connections of the traction battery, high charging currents can be transmitted with low losses, which enables short charging times.

In one embodiment, the charging station is configured as a charging pillar. In particular, the charging station comprises at least one charging point, in particular exactly one charging point or exactly two charging points. In particular, a charging point comprises a charging cable, a charging plug, a charging plug holding device and an electricity meter that complies with calibration law.

In particular, the charging station is configured as a fast charging station. In one embodiment, the charging station is configured as a battery-supported charging station, in particular as a battery-supported fast charging station.

According to a further development of the invention, it is provided that the display device additionally comprises a fan. Advantageously, the display device can thus be cooled not only passively—by switching the backlight on and off and switching the display device off—but also actively by generating an air flow.

Figure 2:
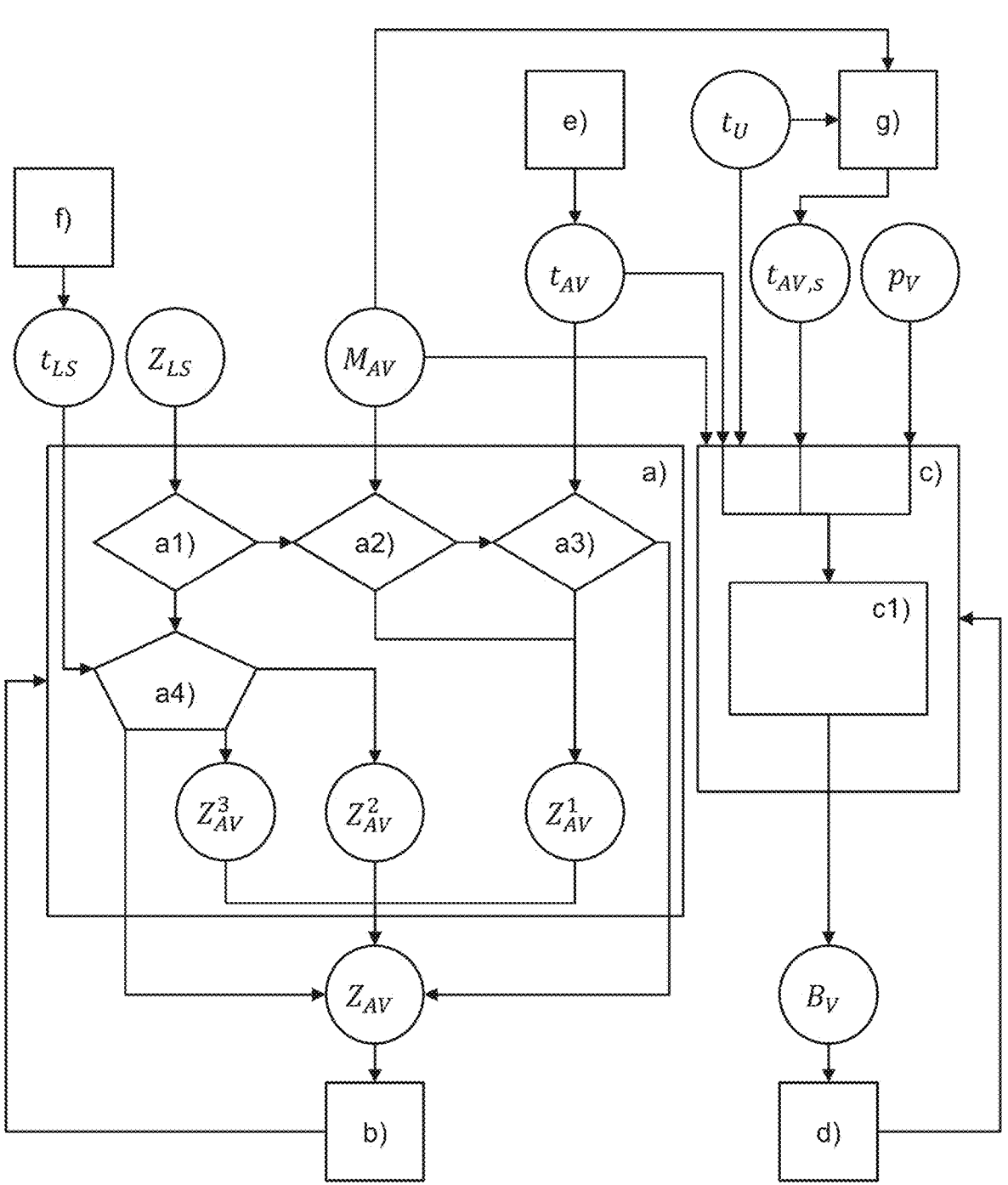

The invention is explained in more detail below with reference to the drawing. Thereby shows:

FIG. 1 a schematic representation of an embodiment example of a charging station, and FIG. 2 a flowchart of an embodiment example of a method for operating a display device of the charging station.

FIG. 1 shows a schematic representation of an embodiment example of a charging station 1 with a display device 3 and a control device 5.

The display device 3 comprises a backlight 7. In addition, at least one fan 9 is preferably associated with the display device 3.

Furthermore, the charging station 1 optionally comprises at least one display device temperature sensor 11, preferably a plurality of display device temperature sensors 11. Alternatively or additionally, the charging station 1 comprises at least one charging station temperature sensor 13, preferably a plurality of charging station temperature sensors 13. In particular, the charging station 1 additionally comprises a climate conditioning device 15. The climate conditioning device 15 preferably comprises a refrigerating machine with a refrigerant circuit and is adapted to cool an air flow and/or a coolant circuit. In particular, a battery of the charging station 1 is cooled by means of the air flow, while power electronics of the charging station 1 are cooled by means of the coolant circuit.

The at least one display device temperature sensor 11, in particular the plurality of display device temperature sensors 11, is adapted to determine a display device area temperature $$ t_{AV}^B $$

associated with a spatial area of the display device 3.

The at least one charging station temperature sensor 13, preferably the plurality of charging station temperature sensors 13, is adapted to determine a charging station area internal temperature $t_{LS}{}^B$ associated with a spatial area of the charging station 1.

The control device 5 is operatively connected to the display device 3, the backlight 7, the fan 9, the at least one display device temperature sensor 11, the at least one charging station temperature sensor 13, and the climate conditioning device 15. Furthermore, the control device 5 is adapted to control the display device 3, the backlight 7 and the fan 9. In addition, the control device 5 is adapted to read out the at least one display device temperature sensor 11, the at least one charging station temperature sensor 13 and the climate conditioning device 15 and/or to receive information from the at least one display device temperature sensor 11, the at least one charging station temperature sensor 13 and the climate conditioning device 15. Furthermore, the control device 5 is adapted to perform a method for operating the display device 3.

The method for operating the display device 3 is explained in more detail in FIG. 2.

FIG. 2 shows a flow diagram of an embodiment example of the method for operating the display device 3 of the charging station 1.

In a first step a), an operating state $Z_{AV}$ of the display device 3 is set based on a display device temperature $t_{AV}$ assigned to the display device 3 and a charging station temperature state $Z_{LS}$ assigned to the charging station 1.

Preferably, the operating state $Z_{AV}$ of the display device 3 is additionally set based on a charging station internal temperature $t_{LS}$ and/or an operating mode $M_{AV}$ of the display device 3.

When the charging station is used as intended, the charging station internal temperature $t_{LS}$ is typically from $-20°$ C. to $45°$ C.

Preferably, in a first initial step a1), the charging station temperature state $Z_{LS}$ is evaluated as a load state of the climate conditioning device 15.

If the charging station temperature state $Z_{LS}$ is an overload state, the operating mode $M_{AV}$ of the display device 3 is evaluated in a second first step a2).

If the display device 3 is in a priority mode, the display device temperature $t_{AV}$ is evaluated in a third first step a3). If the display device temperature $t_{AV}$ is greater than a maximum display device temperature, the first operating state $$ Z_{AV}^1 $$

is set. If the display device temperature $t_{AV}$ is less than or equal to the maximum display device temperature, the last determined or preset operating state $$ Z_{AV}^\square $$

is maintained.

If the display device 3 is in a normal operation when the operating mode $M_{AV}$ of the display device 3 is evaluated in the second first step a2), the first operating state $$z_{AV}^1$$

is set.

If the load state $Z_{LS}$ of the climate conditioning device 15 in the first first step a1) is a normal state, the charging station internal temperature $t_{LS}$ is evaluated in a fourth first step a4). If the charging station internal temperature $t_{LS}$ is greater than or equal to a at least display device ambient temperature, the second operating state $$z_{AV}^2$$

is set. If the charging station internal temperature $t_{LS}$ is less than or equal to a minimum display device ambient temperature, the third operating state $$z_{AV}^3$$

is set. If the charging station internal temperature $$z_{AV}^3$$

is less than the at least display device ambient temperature and greater than the minimum display device ambient temperature, the last determined operating state $$z_{AV}^{\square}$$

is maintained.

In one embodiment, the backlight 7 of the display device 3 is switched off in the first operating state $$z_{AV}^1.$$

In the second operating state $$z_{AV}^2,$$

the backlight 7 of the display device 3 is switched on. In the third operating state $$z_{AV}^3,$$

the display device 3 is switched off. In particular, the display device 3 is switched on in the first operating state $$z_{AV}^1$$

and the second operating state $$z_{AV}^2.$$

In one embodiment, a temperature of 40° C. to 70° C. is used as the maximum display device temperature. Alternatively or additionally, a temperature of 5° C. to 15° C. is used as the at least display device ambient temperature. Alternatively or additionally, a temperature of −5° C. to 5° C. is used as the minimum display device ambient temperature.

In a second step b), the display device 3 is set to the previously set operating state $Z_{AV}$.

In an optional third step c), a fan operating point $B_V$ of the at least one fan 9 is set based on the display device operating mode $M_{AV}$. Preferably, a fan speed of the at least one fan 9 is set as the fan operating point $B_V$.

In one embodiment, in the third step c), at least one fan operating point parameter is additionally used to determine the fan operating point $B_V$. The at least one fan operating point parameter is selected from a group consisting of a charging station ambient temperature $t_U$, the display device temperature $t_{AV}$, a target display device temperature $t_{AV,S}$, a fan control parameter $p_V$, and any combination of at least two of the preceding parameters.

Preferably, the target display device temperature is from 30° C. to 65° C.

In a particularly preferred embodiment, a PI controller c1) is used in the third step c), which determines the fan operating point $B_V$—in particular the fan speed of the at least one fan 9—based on the display device temperature $t_{AV}$, the target display device temperature $t_{AV,S}$ and the fan control parameter $p_V$. Here, the target display device temperature $t_{AV,S}$ is selected as a function of the display device operating mode $M_{AV}$ and the charging station ambient temperature $t_U$, in particular optionally by means of a priority operation correlation or a normal operation correlation.

In an optional fourth step d), the fan 9 is set to the fan operating point $B_V$.

In particular, the operating state $Z_{AV}$ and the fan operating point $B_v$ are set simultaneously, in particular with the same predetermined time interval or with the same frequency.

In an optional fifth step e), the display device temperature $t_{AV}$ is determined. Preferably, the display device temperature $t_{AV}$ is determined based on the at least one display device area temperature $$t_{AV}^B,$$

in particular the plurality of display device area temperatures $$t_{AV}^B.$$

Here, the display device temperature $t_{AV}$ is determined as the at least one display device area temperature $$t_{AV}^B$$

or as a maximum or an average value of the plurality of display device area temperatures $$t^B_{AV}.$$

Preferably, the at least one display device area temperature $$t^B_{AV},$$

in particular the plurality of display device area temperatures $$t^B_{AV},$$

is determined at the same time as the first step a).

In an optional sixth step f), the charging station internal temperature $t_{LS}$ is determined. Preferably, the charging station internal temperature $t_{LS}$ is determined based on the at least one charging station area internal temperature $$t^B_{LS},$$

in particular the plurality of charging station area internal temperatures $$t^B_{LS}.$$

In this case, the charging station internal temperature $t_{LS}$ is determined as the at least one charging station area internal temperature $$t^B_{LS}$$

or as a maximum or an average value of the plurality of charging station area internal temperatures $$t^B_{LS}.$$

Preferably, the at least one charging station area internal temperature $$t^B_{LS},$$

in particular the plurality of charging station area internal temperatures $$t^B_{LS},$$

is determined at the same time as the first step a).

In an optional seventh step g), the target display device temperature $t_{AV,S}$ is selected as a function of the charging station ambient temperature $t_U$ and/or the display device operating mode $M_{Av}$, in particular by means of the priority operation correlation and the normal operation correlation.

In particular, the method is thus performed repeatedly as a whole, in particular cyclically, in particular with the predetermined timing, in particular with a frequency of 1 Hz to 10 Hz, particularly preferred 5 Hz.

The invention claimed is:

1. A method for operating a display device of a charging station, wherein an operating state of the display device is set based on a display device temperature assigned to the display device and a charging station temperature state assigned to the charging station, wherein the display device is set to the operating state, wherein the operating state is selected from a group consisting of:
a first operating state, in which the display device is switched on and a backlight of the display device is switched off, a second operating state, in which the display device is switched on and the backlight of the display device is switched on, and a third operating state, in which the display device is switched off wherein a) the first operating state is set when the charging station temperature state is in an overload state, the display device operating mode is in a priority operation, and the display device temperature is greater than a maximum display device temperature, and b) the first operating state is set when the charging station temperature state is in the overload state and the display device operating mode is in a normal operation, and c) the second operating state is set when the charging station temperature state is in a normal state and a charging station internal temperature is at least equal to a lower limit display device ambient temperature, and d) the third operating state is set when the charging station temperature state is in the normal state and the charging station internal temperature is at most equal to a minimum display device ambient temperature, and further wherein the maximum display device temperature is from 40° C. to 70° C., and the lower limit display device ambient temperature is from 5° C. to 15° C., and the minimum display device ambient temperature is from −5° C. to 5° C.

2. The method according to claim 1, wherein a load state of a climate conditioning device of the charging station is used as the charging station temperature state, wherein the load state is in particular selected from a group consisting of a normal state and an overload state.

3. The method according to claim 1, wherein a display device operating mode is additionally used to determine the operating state.

4. The method according to claim 1, wherein the display device operating mode is selected from a group consisting of a normal operation and a priority operation.

5. The method according to claim 1, wherein a charging station internal temperature of the charging station is additionally used to determine the operating state.

6. The method according to claim 1, wherein based on the display device operating mode, a fan operating point, in particular a fan speed, of at least one fan associated with the display device is set, wherein the fan is set to the fan operating point.

7. The method according to claim 6, wherein at least one fan operating point parameter is additionally used to determine the fan operating point, which is selected from a group consisting of a charging station ambient temperature, the display device temperature, a target display device temperature, a fan control parameter, and any combination of at least two of the preceding parameters.

8. The method according to claim 1, wherein a display device area temperature is determined by means of a plurality of display device temperature sensors, respectively, wherein the display device temperature is determined on the basis of a plurality of display device area temperatures.

9. The method according to claim 1, wherein the operating state of the display device is set repeatedly.

10. A control device for performing a method according to claim 1.

11. The charging station comprising a display device and a control device according to claim 10, wherein the display device comprises a backlight.

12. The charging station according to claim 11, wherein the display device additionally comprises a fan.

\* \* \* \* \*